Figure 1:
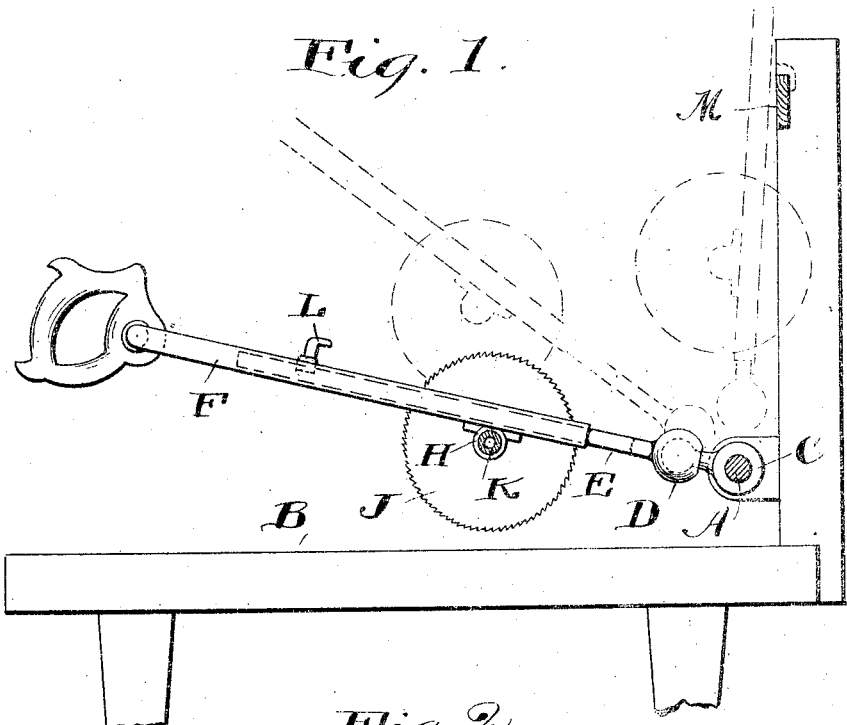

No. 898,067. PATENTED SEPT. 8, 1908.
W. A. RUSSELL.
HAND CONTROLLED POWER OPERATIVE MEAT SAW.
APPLICATION FILED OCT. 23, 1907.

Witnesses.
E. B. Gilchrist.
H. R. Sullivan.

Inventor
William A. Russell
by
Thurston & Woodward

UNITED STATES PATENT OFFICE.

WILLIAM A. RUSSELL, OF KENT, OHIO.

HAND-CONTROLLED POWER-OPERATIVE MEAT-SAW.

No. 898,067.　　　Specification of Letters Patent.　　　Patented Sept. 8, 1908.

Application filed October 23, 1907. Serial No. 398,744.

*To all whom it may concern:*

Be it known that I, WILLIAM A. RUSSELL, residing at Kent, in the county of Portage, and State of Ohio, have invented a certain new and useful Improvement in Hand-Controlled Power-Operative Meat-Saws, of which the following is a full, clear, and exact description.

The object of the invention is to provide an improved construction of meat saw especially adapted to the requirements of butchers for use in facilitating their work.

I am aware that hand controlled power operated saws are old but they have received their power in such manner or have been mounted in such manner as not to permit them to have the capacity for use in the variety of positions desired. For example, certain of them have comprised a hanging frame supporting the saw and an electric motor, the entire apparatus which is bulky and of great weight being suspended from the ceiling. This former type of device is not desirable for many reasons, notably because of the inability to lift and lower the saw readily upon the articles to be cut and the fact of it being necessary to shift the material worked on to a position substantially beneath the saw before lowering it. In this old apparatus if the machine be turned away from the vertical and then lowered sufficiently to contact with the material the swinging of the mechanism back to its vertical position will cause the saw to drag upon the meat block to the injury of the former. There have been certain other devices of the same generic design but many of them have failed to be of practical use either by reason of their complication or lack of reliability and flexibility in their use.

Figure 2:
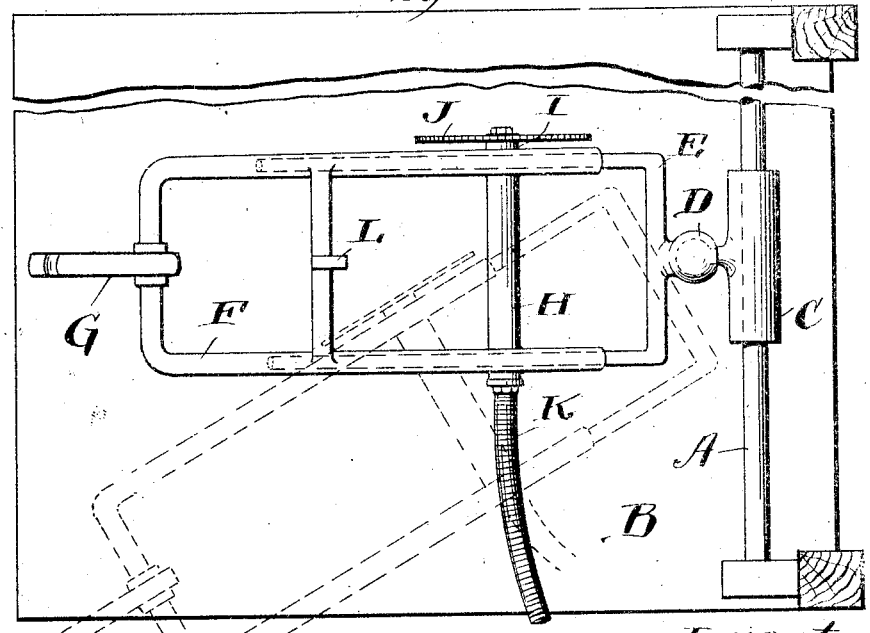

The structure which I have devised is capable of the widest latitude of adjustment and the work involves the use of no overhead supports or superstructure and is capable of application in any place where any sort of power is available. An embodiment thereof is described in the following specification, reference being had to the accompanying drawings in which, Figure 1 is a side elevation of the apparatus, a vertical adjustment of the saw being indicated in dotted lines. Fig. 2 is a plan view of the same, and a lateral, angular adjustment of the saw being indicated in dotted lines.

As will be seen from the drawings, I preferably provide a horizontal supporting shaft A for the saw frame, said shaft being located at the back of the table B slightly above the level of the same and supported at each end on suitable brackets or standards of any desired construction. Mounted on this shaft is a sleeve C capable of being slid laterally along the same and also capable of rotation thereon. Connected with the sleeve by means of a ball and socket joint D which permits both lateral, vertical and turning adjustment, is a rectangular yoke E having telescopic connection with the saw frame F. The saw frame has at its outer end a handle G by which the device is manipulated and a transverse bearing H in which the saw shaft I is mounted, the saw J being preferably located at one side of the frame while the power connection such as a flexible tube K of the sort commonly used in dental engines being lead from the opposite side. As illustrated, I may provide the saw frame with a hook L suitably located and adapted to hang over and catch upon a retaining bar M or similar device when the saw frame is swung upward into vertical position out of the way.

By the arrangement described it will be quite clear that the adjustment of the saw to its work is in every practical sense universal. It can be slid along the table laterally to any part thereof, by reason of the sleeve C mounted on the supporting shaft. It can be lifted to any height by reason of the fact that said sleeve is rotatable on the shaft. It can be swung laterally to any angle by reason of the pivotal connection with the sleeve. It can be twisted to any angle to the vertical by reason of the universal character of the pivotal joint, this joint being as stated a ball and socket. It can be advanced or retracted toward or from the edge of the table by reason of the telescopic character of the supporting frame. It will thus be seen that there is no character of work beyond the capacity of my apparatus, yet it is absolutely steady and held against displacement by the resistance of the material worked upon without subjecting the hand to any strain whatever. Further the power connection is independent of the character of motor employed, it being possible to use any source of power which may be at hand that will impart a rotary motion to the driving tube.

The simple character of installation will be obvious to everyone skilled in the art, it being possible to apply the device to any table without the addition of any parts which will interfere with the use of the table or the super-position of any structure of any character.

Having described my invention, I claim:

1. The combination of a support, means capable of sliding substantially horizontally on said support, a frame so connected to said means as to be capable of universal angular movement and composed of two parts slidable with relation to each other at an angle to the direction of the first mentioned movement, one of said parts bearing one member of the angularly adjustable connection, a shaft having a flexible portion mounted on the other part, and a saw driven thereby.

2. In a hand-controlled, power-operated saw, the combination of a table, a support thereon, means capable of moving on said support laterally with respect to the table, a yoke attached to said means and capable of universal angular movement with respect thereto, a frame mounted to slide telescopically on said yoke, a saw rotatably mounted on said frame and a flexible power-connection for driving said saw.

3. In a hand-controlled, power-operated saw, the combination of a support, means capable of sliding substantially horizontally on said support a yoke so attached to said means as to be capable of universal angular adjustment with respect thereto, a frame mounted to slide telescopically on said yoke, a saw-driving shaft rotatably mounted on said frame, a flexible power connection for said shaft, means for guiding said frame and means for suspending it on said support when not in use.

In testimony whereof, I hereunto affix my signature in the presence of two witnesses.

WILLIAM A. RUSSELL.

Witnesses:
E. B. GILCHRIST.
H. R. SULLIVAN.